(12) United States Patent
Wickeraad

(10) Patent No.: US 7,346,812 B1
(45) Date of Patent: Mar. 18, 2008

(54) APPARATUS AND METHOD FOR IMPLEMENTING PROGRAMMABLE LEVELS OF ERROR SEVERITY

(75) Inventor: John Alan Wickeraad, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 495 days.

(21) Appl. No.: 09/561,179

(22) Filed: Apr. 27, 2000

(51) Int. Cl.
*G06F 11/00* (2006.01)
(52) U.S. Cl. .............................. 714/48; 714/57; 714/45
(58) Field of Classification Search .................. 714/45, 714/48, 57
See application file for complete search history.

(56) References Cited

U.S. PATENT DOCUMENTS

| | | | | |
|---|---|---|---|---|
| 3,999,051 | A * | 12/1976 | Petschauer | 714/710 |
| 4,881,230 | A * | 11/1989 | Clark et al. | 714/712 |
| 4,932,028 | A * | 6/1990 | Katircioglu et al. | 714/45 |
| 5,155,731 | A * | 10/1992 | Yamaguchi | 714/45 |
| 5,226,150 | A * | 7/1993 | Callander et al. | 714/57 |
| 5,448,725 | A * | 9/1995 | Gervais | 714/47 |
| 5,506,960 | A * | 4/1996 | Meare | 714/45 |
| 5,596,716 | A * | 1/1997 | Byers et al. | 714/48 |
| 5,699,403 | A * | 12/1997 | Ronnen | 379/15.04 |
| 5,787,095 | A * | 7/1998 | Myers et al. | 714/820 |
| 5,933,592 | A * | 8/1999 | Lubbers et al. | 714/6 |
| 6,006,016 | A * | 12/1999 | Faigon et al. | 714/48 |
| 6,356,282 | B2 * | 3/2002 | Roytman et al. | 345/736 |
| 6,513,129 | B1 * | 1/2003 | Tentij et al. | 714/4 |
| 6,615,374 | B1 * | 9/2003 | Moran | 714/48 |
| 6,636,991 | B1 * | 10/2003 | Quach | 714/52 |

OTHER PUBLICATIONS

Hennessy et al., "Computer Organization and Design", 1998, Morgan Kaufmann Publishers, Inc., Second Edition, pp. 225,229, and 230.*
Free On-Line Dictionary of Computing definition of "register"; 1 sheet, unknown date.
Whatis.com definition of "register"; 1 sheet, unknown date.
Jim Minatel, et al.; "Upgrading and Repairing PCs Tenth Anniversary Edition"; copyright 1998 by Que Corporation; pp. 39 and 143.
David J. Bradley, "Library of Congress Cataloging in Publication Data", Copyright 1984; pp. 28-30

* cited by examiner

*Primary Examiner*—Gabriel Chu

(57) ABSTRACT

A method and apparatus using a set of registers for indicating multiple error levels in a data processing system, wherein a register allows software to reprogram or redefine the error level to another desired error level. One embodiment of the invention involves a method for indicating errors in a data processing system with multiple error levels, indicating that an error corresponds to one of the multiple error levels, representing the error with a set of memory cells, and changing the error level of the error to another error level of the multiple error levels. A second embodiment of the invention involves a data processing system or an error log system, having an associated error level chosen from a plurality of error levels for an error. The data processing system or error log system includes a set of memory cells, with a primary error log to record the error, at least one error enable register that can be read and written to redefine the error level of the error to one of said plurality of error levels. In a preferred embodiment, the recording of the error levels with the set of memory cells includes recording the first occurrence of the most severe error in the primary error log. And a state machine keeps track of the most severe error that has been logged in the primary error log.

24 Claims, 6 Drawing Sheets

100

| PRIMARY ERROR LOG REGISTER | | | | | | | | | |
|---|---|---|---|---|---|---|---|---|---|
| FE 102 | UNC 104 | COR 106 | OV 108 | E27 110 | E26 112 | E25 114 | E24-E2 116 | E1 118 | E0 120 |

| SECONDARY ERROR LOG REGISTER | | | | | | |
|---|---|---|---|---|---|---|
| RESERVED | E27 110 | E26 112 | E25 114 | E24-E2 116 | E1 118 | E0 120 |

| | | | | | | |
|---|---|---|---|---|---|---|
| FATAL ERROR ENABLE REGISTER | | | | | | |
| | E27 110 | E26 112 | E2 114 | E24-E2 116 | E1 118 | E0 120 |

| | | | | | | |
|---|---|---|---|---|---|---|
| UNCORRECTABLE ERROR ENABLE REGISTER | | | | | | |
| | E27 110 | E26 112 | E25 114 | E24-E2 116 | E1 118 | E0 120 |

| | | | | | | |
|---|---|---|---|---|---|---|
| CORRECTABLE ERROR ENABLE REGISTER | | | | | | |
| | E27 110 | E26 112 | E25 114 | E24-E2 116 | E1 118 | E0 120 |

FIG. 5

APPARATUS AND METHOD FOR IMPLEMENTING PROGRAMMABLE LEVELS OF ERROR SEVERITY

BACKGROUND OF THE INVENTION

1. Field of the Invention

This invention relates generally to an improvement in error logging, and more specifically to programming the error levels of errors occurring in a data processing system.

2. Description of the Prior Art

Many data processing systems (e.g., computer systems, programmable electronic systems, telecommunication switching systems, control systems, and so forth) detect different types of errors. Some errors indicate a minor problem while other errors indicate a serious problem. Because data processing systems are being designed to offer higher percentages of "up-time," it is critical to know how severe an error is and whether the system must be shut down to limit data corruption, or if the system can continue to operate without impact to the user.

These are examples of errors that are detected:

(1) A single bit error correction code (ECC) error is correctable in hardware.

(2) A double bit ECC error, which may be a fatal error, depending on the data processing system and the type of packet.

(3) A timeout error has variable levels of severity, depending on which process was timed out.

These are typical levels of error severity:

(1) A correctable error is an error that can be corrected, and which is logged.

(2) An uncorrectable error is an error which may require some software help to keep the error contained and keep the system running.

(3) A fatal error is an error that has corrupted the system, and which may cause data corruption if the data processing system or subsystem is not halted immediately.

Each error is originally classified in its level of severity during the design of the data processing system. Many prior art data processing systems have the ability to either disable an error from being reported, or to "promote" (i.e., raise) the severity level of any error to a fatal error level. This allows some flexibility, but in some cases is not adequate. For example, an error that was initially thought to be a correctable error may turn out to be a more severe error, requiring software assistance to fully contain the error and keep the data processing system running.

It would be desirable to have the capability to change error levels from any level to any other level. It would also be desirable to have the capability to change error levels, depending on the particular configuration of a data processing system.

SUMMARY OF THE INVENTION

An object of the invention is to provide the capability of changing error levels from any level to any other level.

A first aspect of the invention is directed to a method for indicating errors in a data processing system with a plurality of error levels. The method includes steps indicating that an error corresponds to one error level of the plurality of error levels, representing the error with a set of memory cells, and changing the error level of the error to another error level of the plurality of error levels, wherein the other error level can be selected from the plurality of error levels.

A second aspect of the invention is directed to a data processing system or an error log system, having an error and an associated error level chosen from a plurality of error levels. The data processing system or error log system includes a set of memory cells, with a primary error log to record the error, and at least one error enable register that can be read and written to redefine the error level of the error to one of the plurality of error levels.

These and other objects and advantages of the invention will become apparent to those skilled in the art from the following detailed description of the invention and the accompanying drawings.

BRIEF DESCRIPTION OF THE DRAWINGS

FIG. 1 shows one register that is used for the primary error log, which will log the first occurrence of the most severe error that occurred.

FIG. 2 shows a second register that is used for the secondary error log, which will indicate all additional errors with a severity level equal to or less than the most severe error that has occurred since the last time the error log registers were cleared.

FIG. 3 shows a third register that is used for fatal error enabling, which allows any error to be defined to be at the fatal error level.

FIG. 4 shows a fourth register that is used for uncorrectable error enabling, which allows any error to be defined to be at the uncorrectable error level.

FIG. 5 shows a fifth register that is used for correctable error enabling, which allows any error to be defined to be at the correctable error level.

DETAILED DESCRIPTION OF PREFERRED EMBODIMENTS OF THE INVENTION

Figure 6:
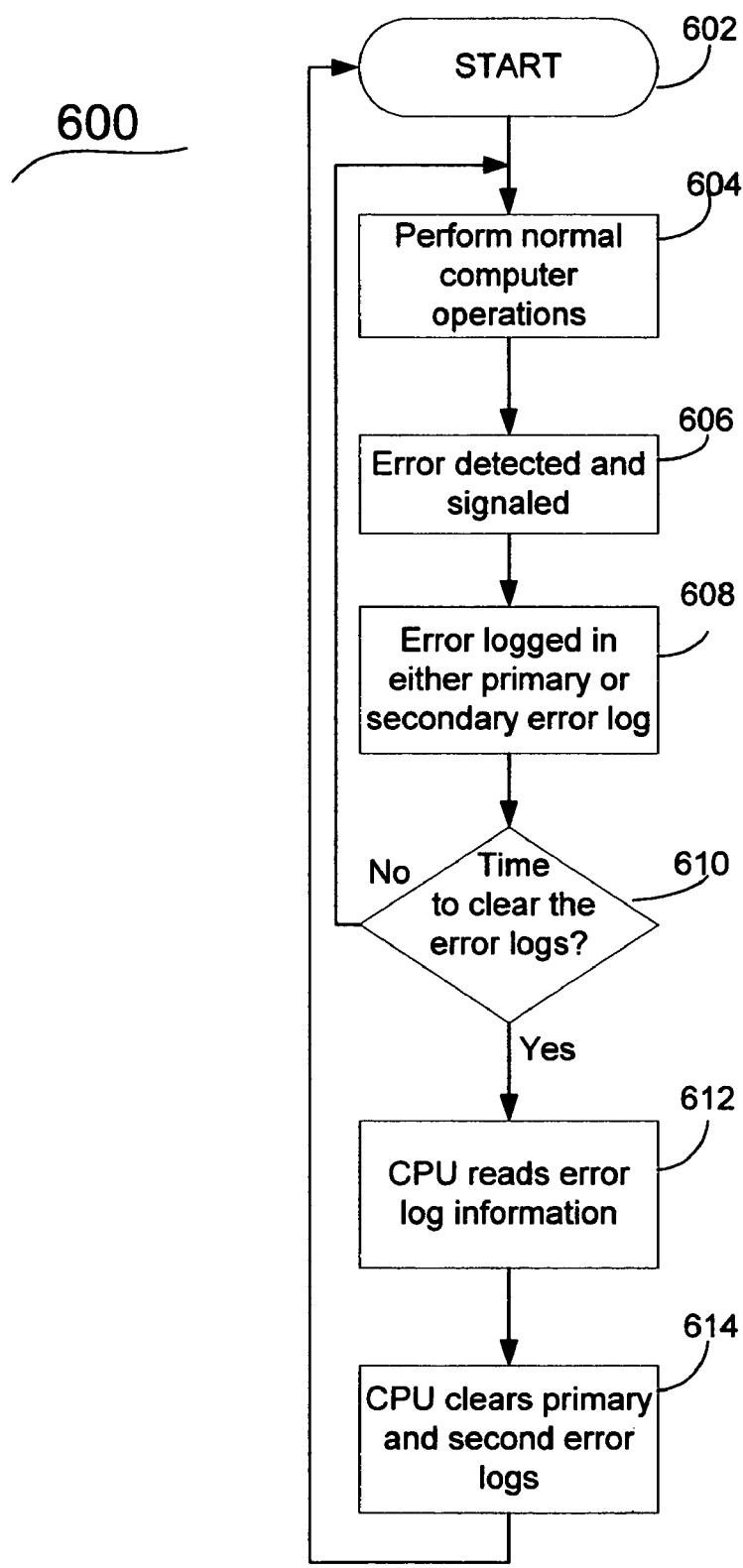
FIG. 6 illustrates a flow chart of a method for using a primary error log and a secondary error log in accordance with one embodiment of the present invention.

This invention provides a method and apparatus for programming the error levels of errors occurring in a data processing system. This allows all errors to be programmed to have any error level. All errors default to an uncorrectable error level, and software will set the error levels to the appropriate level during initialization. This will ensure that all errors are logged from power-on, but an error will not cause the data processing system to go to a fatal error level so fast that it becomes difficult to debug the data processing system when it is powered on.

In one preferred embodiment of the invention, there is a primary error log and a secondary error log. In alternative embodiments, there could be either no error log or only a primary error log. Furthermore, one preferred embodiment of the invention uses three enable registers to enable the definition of any error as having a fatal error level, an uncorrectable error level, or a correctable error level, respectively.

One preferred embodiment of the invention uses a fourth level of error severity, which is called an advisory or disabled error. Normally when an error is disabled, the error is not logged if it occurs. In one preferred embodiment, an error is still logged in a secondary error log register, even when it is disabled. In this way, it will be possible to determine if the error is still occurring. The secondary error log register allows all occurring errors to be indicated, not only the first most severe error, as in prior art implementations. An error interrupt is sent to the central processing unit (CPU) for only the designated level of error severity. The CPU can designate which level of error severity will cause an error interrupt to be sent to the CPU.

Alternative embodiments of the invention could use a larger or smaller number of enable registers for a correspondingly larger or smaller number of error levels. Moreover, alternative embodiments of the invention could use a number of registers less than the number of error levels, such as by using one register to record more than one error level. Alternative embodiments of the invention could use error mask registers instead of error enable registers. In other words, alternative embodiments could program the error levels associated with error mask registers, for example by disabling some errors and enabling other errors by default.

In a preferred embodiment of the invention, there are multiple sets of five registers for dealing with enabling and logging errors. Preferably, the number of sets corresponds to the number of sub-unit communication interfaces where errors can occur and errors can be isolated by software. Each register will have enough bits (preferably at least 16 bits and typically 32 bits or 64 bits) to indicate the number of types of errors that can occur in the communication interface. Since each set of five registers is similar in function, one set will be described.

FIG. 1 shows one register that is used for the primary error log 100, which will log the first occurrence of the most severe error that occurred. In one preferred embodiment of the invention, there is one bit each for a fatal error (FE) 102, and uncorrectable error (UNC) 104, a correctable error (COR) 106, and an overflow of multiple errors (OV) 108. In one preferred embodiment, the primary error log 100 has a unique bit for each error. In this example, there are 28 bits for 28 unique errors, such as (E27) 110, (E26) 112, (E25) 114, (E24-E2) 116, (E1) 118, and (E0) 120.

FIG. 2 shows a second register that is used for the secondary error log 200, which will indicate all additional errors with a severity level equal to or less than the most severe error that has occurred since the last time the error log registers were cleared. In one preferred embodiment, the secondary error log 200 has a unique bit for each error. In this example, there are 28 bits for 28 unique errors, such as (E27) 110, (E26) 112, (E25) 114, (E24-E2) 116, (E1) 118, and (E0) 120. Both the secondary error log 200 and the primary error log 100 can be implemented with flip-flops, latches, random access memory, or programmable memory, such as flash memory.

FIG. 3 shows a third register that is used as a fatal error enable register 300, which allows any error to be defined to be at the fatal error level. This register is useful in defining a transient error as a fatal error in order to stop the operation of the data processing system and track the source of the transient error. In one preferred embodiment of the invention, the fatal error enable register 300 has a unique bit for each error. In this example, there are 28 bits for 28 unique errors, such as (E27) 110, (E26) 112, (E25) 114, (E24-E2) 116, (E1) 118, and (E0) 120.

FIG. 4 shows a fourth register that is used as an uncorrectable error enable register 400, which allows any error to be defined to be at the uncorrectable error level. This register is useful in defining an error as an uncorrectable error in order to stop a transaction from contaminating data in the data processing system, while allowing other transactions to continue. In one preferred embodiment of the invention, the uncorrectable error enable register 400 has a unique bit for each error. In this example, there are 28 bits for 28 unique errors, such as (E27) 110, (E26) 112, (E25) 114, (E24-E2) 116, (E1) 118, and (E0) 120.

FIG. 5 shows a fifth register that is used as a correctable error enable register 500, which allows any error to be defined to be at the correctable error level. This register is useful in defining a known error as a correctable error in order to continue the operation of the data processing system and determine what errors follow this error. In one preferred embodiment of the invention, the correctable error enable register 500 has a bit for each unique type of error. In this example, there are 28 bits for 28 unique errors, such as (E27) 110, (E26) 112, (E25) 114, (E24-E2) 116, (E1) 118, and (E0) 120. The correctable enable register 500 and the previous enable registers can be implemented with flip-flops, latches, random access memory, or programmable memory, such as flash memory.

Errors can be reported with encoded bits or with individual, dedicated bits. But in preferred embodiments of the invention, each error is reported with an individual bit, as shown in FIGS. 1-5. Each unique type of error has a corresponding bit in each of the five registers. This allows firmware or diagnostic software to directly determine exactly which type of error occurred without decoding delay, and this avoids transitory error bit states that might be erroneously interpreted as the actual errors. For example, erroneous interpretation is possible if the data processing system fails completely in a very sudden event, and one or more transitory error bits are frozen at incorrect states in diagnostic registers that are later read after recovery from the failure.

In a preferred embodiment, the three enable registers can be read and written by software. This allows software to modify the severity level of an error from the default value. It should be noted that the new severity enable bit should be written before the old severity enable bit is cleared, when changing the severity of an error. This also permits software to determine the configuration of the data processing system and modify the error levels accordingly for each unique type of error.

The severity enable registers define the severity of an error as shown in Table 1:

TABLE 1

| \multicolumn{4}{c}{Error Enable and Error Severity Level Definition} |
| Fatal Error Enable | Uncorrect. Err. Enab. | Correct. Err. Enable | Error Severity Level |
| --- | --- | --- | --- |
| 0 | 0 | 0 | Advisory - Error is only logged in secondary error log. |
| 0 | 0 | 1 | Correctable - Error is logged in primary error log if no higher or previous error. |

TABLE 1-continued

Error Enable and Error Severity Level Definition

| Fatal Error Enable | Uncorrect. Err. Enab. | Correct. Err. Enable | Error Severity Level |
|---|---|---|---|
| 0 | 1 | X (don't care state) | Uncorrectable - Error is logged in primary error log if no higher or previous error. |
| 1 | X | X | Fatal - Error is logged in primary error log if no other fatal error is logged. |

The primary error log register will usually have no error bits set or only one error bit set. The only time multiple error bits will be set is when a less severe error is detected first, followed by a more severe error (or if multiple errors of the same severity occur in the same clock cycle). When a more severe error occurs after a less severe error, the less severe error bit is left set. Thus, it is possible for errors in all three levels of error severity to be set in the primary error log register, such as when a correctable error is detected as the first error, and the correctable error is followed by an uncorrectable error, and the uncorrectable error is followed by a fatal error.

The secondary error log register will set an error bit when an error has occurred, and an error of the same or higher severity level has already been logged in the primary error log register. This includes errors that occur again. This will allow software to determine all the errors that were detected, not just the first error detected. This can provide extremely useful information for successfully debugging a data processing system.

FIG. 6 illustrates a flow chart 600 of a method for using a primary error log and a secondary error log in accordance with one embodiment of the present invention. The method starts in operation 602. In operation 604, the data processing system performs normal data processing system processing tasks with a possibility of encountering errors associated with the processing tasks or even errors that are not directly associated with a present processing task. In operation 606, an error is detected and signaled by appropriate circuitry and software. In operation 608, the error is logged in the primary error log if it is the most severe error encountered since the error logs were cleared. If the error is not the most severe error encountered since the error logs were cleared or the error is occurring repeatedly, then the error is logged in the secondary error log. Operation 608 is then followed by operation 610, which determines if it is time to clear the primary and secondary error logs. If it is not time to clear the error logs, then operation 604 is repeated. If it is time to clear the error logs, then operation 612 is performed. In operation 612, a central processing unit (CPU) reads the error log information, performs any appropriate actions, and transfers the information to an appropriate destination, such as a disk memory, a printer for print out, or some other kind of peripheral device. In operation 614, the CPU clears the error logs when the information is no longer useful and the error logs would be more useful in handling data processing system errors by recording any errors that occur during a new session when the data processing system returns to operation 602.

Figure 7:
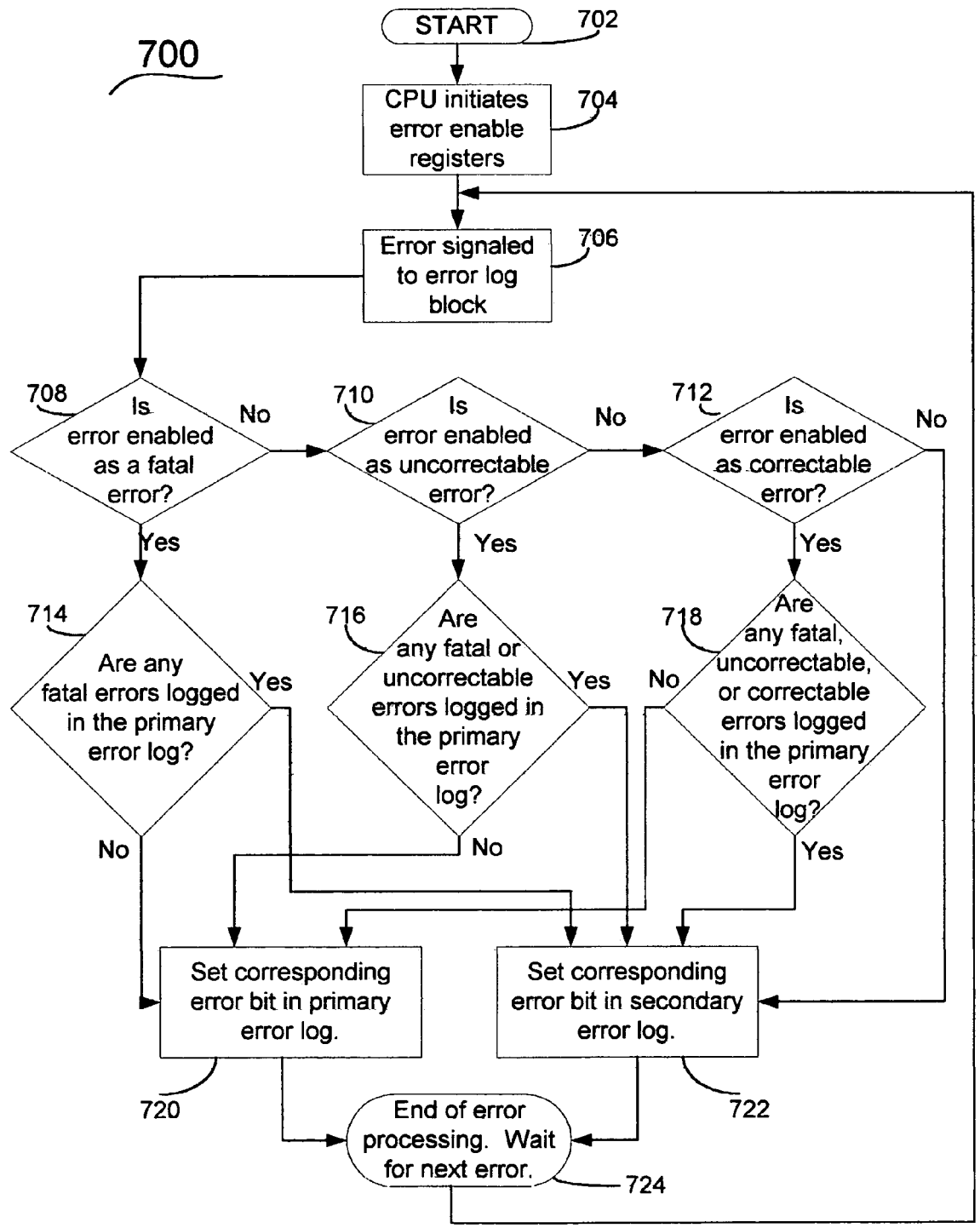
FIG. 7 illustrates a more detailed flow chart of the method illustrated in FIG. 6 and shows how corresponding error bits are set in a primary error log and a secondary error log in accordance with one embodiment of the present invention.

FIG. 7 illustrates a more detailed flow chart of the method illustrated in FIG. 6 and shows how corresponding error bits are set in a primary error log and a secondary error log in accordance with one embodiment of the present invention. The method starts in operation 702. In operation 704, the CPU initiates the error enable registers. In operation 706, an error is signaled to the error log block.

In operation 708, a test is performed to determine if the error is enabled as a fatal error. If the error is enabled as a fatal error, in operation 714 a test is performed to determine if there are any fatal errors logged in the primary error log. If there are no fatal errors logged in the primary error log, then in operation 720 a corresponding error bit is set in the primary error log, in operation 724 the error processing ends, and operation 706 is next. If the test of operation 714 determines that there is a fatal error logged in the primary error log, the operation 722 is next, where the corresponding error bit is set in the secondary error log. Then in operation 724 the error processing ends, and operation 706 is next.

If the test of operation 708 determines that the error is not enabled as a fatal error, the operation 710 is next, where a test is performed to determine if the error is enabled as an uncorrectable error. If the error is enabled as an uncorrectable error, then operation 716 is next, where a test is performed to determine if there are any fatal errors or uncorrectable errors logged in the primary error log. If there are no fatal errors and no uncorrectable errors, then in operation 720 the corresponding error bit is set in the primary error log, the error processing ends in operation 724, and operation 706 is next. If there is a fatal error or an uncorrectable error, then in operation 722 the corresponding error bit is set in the secondary error log, the error processing ends in operation 724, and operation 706 is next.

If the test of operation 710 determines that the error is not enabled as an uncorrectable error, then operation 712 is next, where a test is performed to determine if the error is enabled as a correctable error. If the error is enabled as a correctable error, then operation 718 is next, where a test is performed to determine if there are any fatal errors, uncorrectable errors, or correctable errors logged in the primary error log. If there are no fatal, uncorrectable, or correctable errors logged in the primary error log, then in operation 720 the corresponding error bit is set in the primary error log, the error processing ends in operation 724, and operation 706 is next. If there is a fatal, uncorrectable, or correctable error, then in operation 722 the corresponding error bit is set in the secondary error log, the error processing ends in operation 724, and operation 706 is next. Accordingly, a method for less than or more than three error severity levels can be created by modification of the preceding example.

All error detection blocks send a signal indicating when an error occurs. There is a separate signal for each unique error. These signals are concatenated into a vector (i.e., a data structure with an ordered sequence of bits) "all_new_err," in the same order and format as the enable bits of the registers defined above. An active bit (set to a logical "one") in the vector indicates that the error represented by that bit has occurred. The "all_new_err" vector is logically ANDed with the different enable bits to create four more vectors, "all_new_cor_err," "all_new_unc_err," "all_new_fe_err," and "all_new_disabled_err." Each of the vectors represents the errors occurring for that level of error severity. An active bit in one of these vectors indicates that the error (represented by that bit) has occurred, and the error is set to that level of error severity. When all the enable bits for an error are set to a logical "zero," then it is assumed to be a disabled error. When a disabled error occurs, it is indicated by a corresponding active bit in the vector "all_new_disabled_err," and the disabled error is only recorded in the secondary error log.

Figure 8:
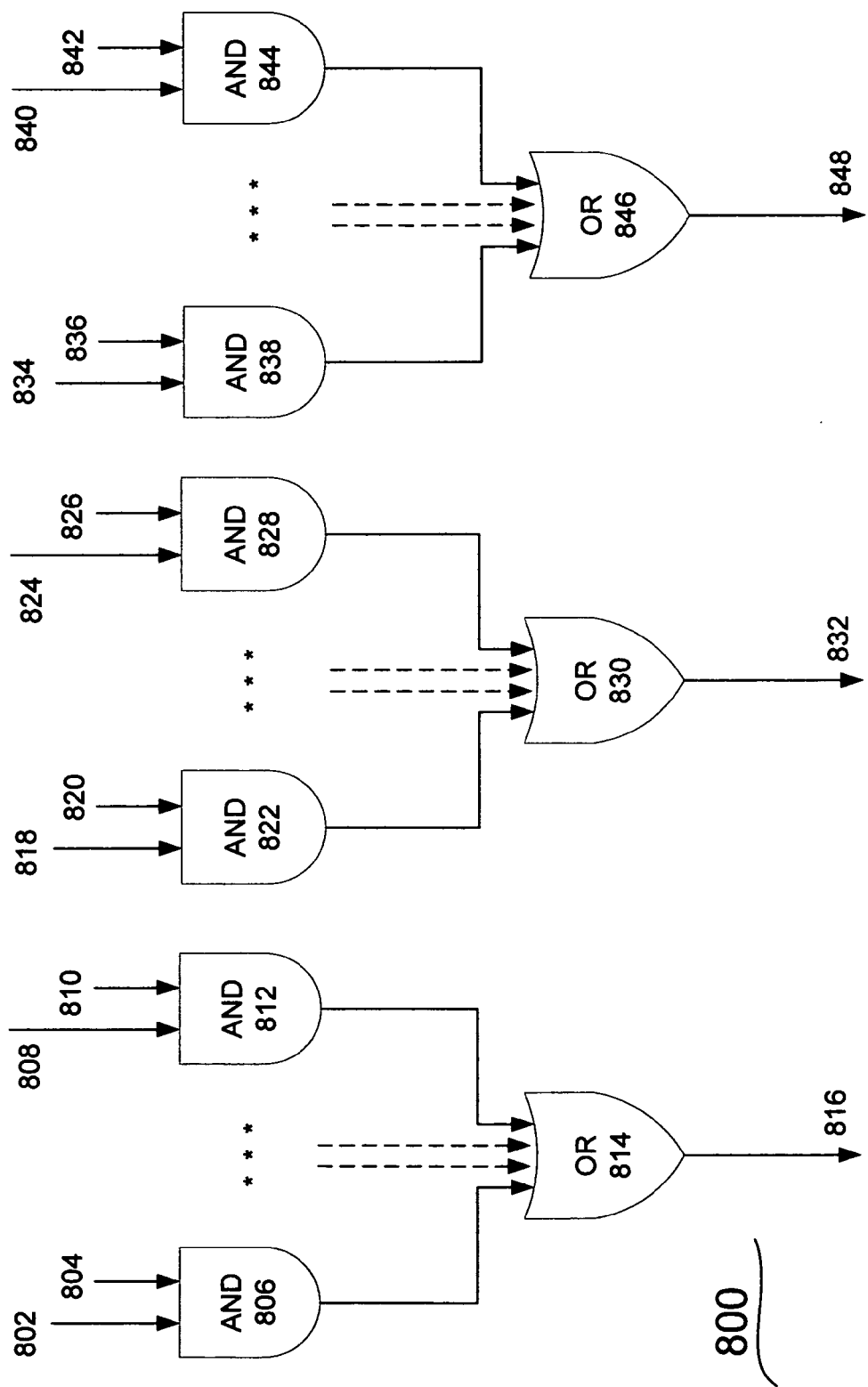
FIG. 8 illustrates one embodiment of a circuit including logical AND gates to generate the signals "all_new_cor_err," "all_new_unc_err," and "all_new_fe_err," and logical OR gates to generate the signals "new_fe_err," "new_unc_err," and "new_cor_err."

FIG. 8 illustrates one embodiment of a circuit including logical AND gates to generate the signals "all_new_cor_err," and "all_new_unc_err," and "all_new_fe_err," and logical OR gates to generate the signals "new_fe_err" 816, "new_unc_err" 832, and "new_cor_err" 848. The logical AND gates for generating the signals corresponding to error type N and error type 0 are shown, where N typically ranges from 63 to 20 (e.g., in FIGS. 1-5, N was 27). The error signals of type N-1 through type 1, and their respective logical AND gates would be included in a preferred embodiment, but are not shown to reduce the complexity and to improve the clarity of the disclosure.

Error signal 802 indicates an error of type N has occurred. Error signal 802 is an input signal to logical AND gate 806, which also receives an input signal 804 from the corresponding fatal error enable bit for an error of type N. AND gate 806 generates an output signal corresponding to the "all_new_fe_err(N)" bit, which is an input signal to logical OR gate 814. Error type 0 signal 808 is an input signal to logical AND gate 812, which also receives an input signal 810 from the corresponding fatal error enable bit for an error of type 0. AND gate 812 generates an output signal corresponding to the "all_new_fe_err(0)" bit, which is an input signal to logical OR gate 814. Logical OR gate 814 receives as input signals all the bits in the "all_new_fe_err" vector, and produces the output signal "new_fatal_err" 816; this output signal indicates at least one error has occurred that is set to the fatal error severity level.

Error signal 818 indicates an error of type N has occurred. Error signal 818 is an input signal to logical AND gate 822, which also receives an input signal 820 from the corresponding uncorrectable error enable bit for an error of type N. AND gate 822 generates an output signal corresponding to the "all_new_unc_err(N)" bit, which is an input signal to logical OR gate 830. Error type 0 signal 824 is an input signal to logical AND gate 828, which also receives an input signal 826 from the corresponding uncorrectable error enable bit for an error of type 0. AND gate 828 generates an output signal corresponding to the "all_new_unc_err(0)" bit, which is an input signal to logical OR gate 830. Logical OR gate 830 receives as input signals all the bits in the "all_new_unc_err" vector, and produces the output signal "new_unc_err" 832; this output signal indicates at least one error has occurred that is set to the uncorrectable error severity level.

Error signal 834 indicates an error of type N has occurred. Error signal 834 is an input signal to logical AND gate 838, which also receives an input signal 836 from the corresponding correctable error enable bit for an error of type N. AND gate 838 generates an output signal corresponding to the "all_new_cor_err(N)" bit, which is an input signal to logical OR gate 846. Error type 0 signal 840 is an input signal to logical AND gate 844, which also receives an input signal 842 from the corresponding correctable error enable bit for an error of type 0. AND gate 844 generates an output signal corresponding to the "all_new_cor_err(0)" bit, which is an input signal to logical OR gate 846. Logical OR gate 846 receives as input signals all the bits in the "all_new_cor_err" vector, and produces the output signal "new_cor_err" 848; this output signal indicates at least one error has occurred that is set to the correctable error severity level.

The two vectors "primary_err_log" and "secondary_err_log" have bit patterns similar to the bit patterns in the primary error log register and secondary error log register to keep track of which errors have occurred, as described above.

A state machine keeps track of the level of error severity currently logged, and will only allow a more severe error to be logged into the primary error log vector. For example, if a correctable error has been logged, but an uncorrectable error is indicated by the "new_unc_err" (and "new_fe_err" is not set), the "all_new_unc_err" vector is logically ORed into the existing primary error log vector "primary_err_log." However, if an uncorrectable error or fatal error is already logged, the "all_new_unc_err" vector will be logically ORed into the secondary error log vector "secondary_err_log," because this error is not more severe than the errors already logged. This allows all errors that have occurred to be logged.

Figure 9:
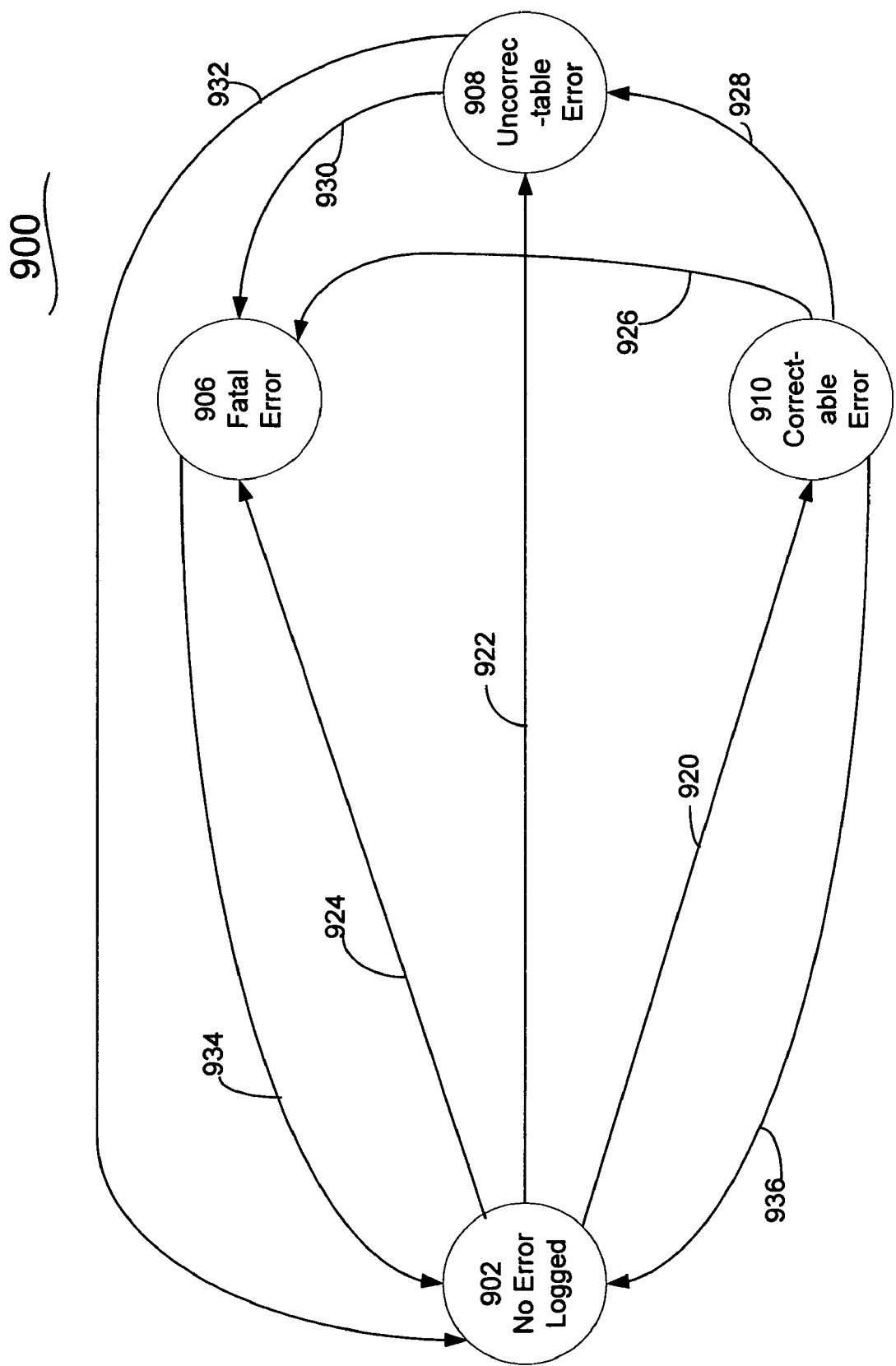
FIG. 9 illustrates a state diagram with labeled transitions for a state machine in accordance with one embodiment of the present invention.

FIG. 9 illustrates a state diagram with labeled transitions for a state machine in accordance with one preferred embodiment of the present invention. In state 902, no errors have been logged. If the error is a fatal error, and no fatal error has yet been logged in the primary error log, then the state machine transitions by path 924 to state 906 to log the error in the primary error log, and the state machine eventually returns to state 902 in path 934 when the error logs are cleared. If the error is a fatal error, and a fatal error has already been logged in the primary error log, then the state machine stays in state 906. If the error is an uncorrectable error, and no fatal error or uncorrectable error has yet been logged in the primary error log, then the state machine transitions by path 922 to state 908 to log the error in the primary error log, and the state machine eventually returns to state 902 in path 932 when the error logs are cleared. If the error is an uncorrectable error, and either a fatal error or an uncorrectable error has already been logged in the primary error log, then the state machine stays in state 906 or state 908, respectively. If the error is a correctable error, and no fatal error, uncorrectable error, or correctable error has yet been logged in the primary error log, then the state machine transitions by path 920 to state 910 to log the error in the primary error log, and the state machine eventually returns to state 902 in path 936 when the error logs are cleared. If the error is a correctable error, and a fatal error, an uncorrectable error, or a correctable error has already been logged in the primary error log, then the state machine stays in state 906, state 908, or state 910, respectively.

The state machine stays in a state, unless a more severe error occurs, or until the CPU clears the error logs. For example, if only a correctable error occurred and the state machine is in state 910 and an uncorrectable error occurs, then the state machine transitions by path 928 to state 908. Moreover, if the state machine is in state 910 and a fatal error occurs, then the state machine transitions by path 926 to state 906. Furthermore, if the state machine is in state 908 and a fatal error occurs, then the state machine transitions by path 930 to state 906. Additionally, the primary error log is updated when a more severe error occurs.

In one preferred embodiment of the invention, if an error is cleared, that error and any error of equal or lesser severity will not be logged in the cycle after the clear. This embodiment will not miss any errors, since these errors would not have been logged in the primary error log. A "last_state" variable is used in the idle state to indicate if an error was just cleared. The "last_state" variable is used to allow more severe errors to still be detected and logged. However, errors that are of the same severity or less severe will not be logged if they happen in the next cycle. This embodiment can more easily keep other registers with error information consistent with the primary and secondary error log registers.

The most preferred embodiment of the invention uses registers to implement the error logs and the enable registers. However, alternative embodiments of the invention could use other types of volatile or non-volatile memory cells (e.g., discrete flip-flops, discrete latches, random access memory, magnetic memory, or programmable memory, such as flash memory) to implement one or more of the error logs or one or more of the enable registers.

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A method using registers within a processor for indicating errors in a data processing system with a plurality of error levels, comprising steps of:
   indicating that an error corresponds to one error level of said plurality of error levels;
   representing said error with a set of memory cells;
   defining said error in at least one of a plurality of error enable registers, wherein each of said plurality of error enable registers corresponds to one of said plurality of error levels; and
   changing the error level of said error to another error level of said plurality of error levels, such that errors logged from power on will not cause said data processing system to go to a fatal error level so fast that is becomes difficult to debug said data processing system when said data processing system is powered on.

2. The method of claim 1, wherein said step of representing said error with a set of memory cells further includes defining said error with an individual register bit in at least one of said plurality of error enable registers.

3. The method of claim 1, wherein said step of representing said error with a set of memory cells further includes recording the first occurrence of said error in a primary error log.

4. The method of claim 3, wherein said step of representing said error with a set of memory cells further includes recording said error in a secondary error log when said error is not recorded in said primary error log.

5. The method of claim 3, wherein said step of representing said error with a set of memory cells further includes using a state machine to keep track of said error in said primary error log.

6. The method of claim 1, wherein said step of representing said error with a set of memory cells further includes defining said error with an error level selected from the group consisting of a correctable error level, an uncorrectable error level, a fatal error level, or a disabled error level.

7. The method of claim 1, wherein said step of representing said error with a set of memory cells further includes defining an error initially as having an uncorrectable error level and changing said uncorrectable error level to a correctable error level.

8. The method of claim 1, wherein said step of representing said error with a set of memory cells further includes generating a first vector representing any occurrence of a correctable error, a second vector representing any occurrence of an uncorrectable error, and a third vector representing any occurrence of a fatal error.

9. A data processing system, having an associated error level chosen from a plurality of error levels for an error, comprising:
   a set of memory cells, including
   a primary error log to record said error, and
   at least one error register that can be read and written to redefine the error level of said error to one of said plurality of error levels.

10. The data processing system of claim 9, further including a state machine to keep track of said error in said primary error log.

11. The data processing system of claim 9, further including a plurality of error enable registers, each of said plurality of error enable registers corresponding to one of said plurality of error levels.

12. The data processing system of claim 11, wherein at least one of said plurality of error enable registers represents an error with an individual register bit.

13. The data processing system of claim 9, wherein said set of memory cells further includes a secondary error log.

14. The data processing system of claim 9, wherein said plurality of error levels further includes a correctable error level and an uncorrectable error level.

15. The data processing system of claim 9, wherein said plurality of error levels further includes a correctable error level, an uncorrectable error level, a fatal error level, and a disabled error level.

16. An error log system, comprising:
   a set of registers, including
   a primary error log to record at least one error having a corresponding error level, and
   at least one error enable register that can be read and written to redefine said corresponding error level of said at least one error to one of a plurality of error levels.

17. The error log system of claim 16, further including a state machine to keep track of said at least one error in said primary error log.

18. The error log system of claim 16, further including a plurality of error enable registers, each of said plurality of error enable registers corresponding to one of said plurality of error levels.

19. The error log system of claim 18, wherein at least one of said plurality of error enable registers represents at least one error with an individual register bit.

20. The error log system of claim 16, further comprising a secondary error log.

21. The error log system of claim 16, wherein said plurality of error levels further includes a correctable error level and an uncorrectable error level.

22. The error log system of claim 16, wherein said plurality of error levels further includes a correctable error level, an uncorrectable error level, a fatal error level, and a disabled error level.

23. The error log system of claim 16, further comprising at least one error mask register.

24. The error log system of claim 16, wherein said primary error log records only the first occurrence of an error according to a chosen ranking of error severity of said plurality of error levels.

* * * * *

UNITED STATES PATENT AND TRADEMARK OFFICE
CERTIFICATE OF CORRECTION

| | | |
|---|---|---|
| PATENT NO. | : 7,346,812 B1 | Page 1 of 1 |
| APPLICATION NO. | : 09/561179 | |
| DATED | : March 18, 2008 | |
| INVENTOR(S) | : John Alan Wickeraad | |

It is certified that error appears in the above-identified patent and that said Letters Patent is hereby corrected as shown below:

On sheet 2 of 6, in fig. 3, in box "114", delete "E2" and insert -- E25 --, therefor.

In column 3, line 43, before "uncorrectable" delete "and" and insert -- an --, therefor.

In column 6, line 16, after "log," delete "the" and insert -- then --, therefor.

In column 6, line 20, after "error," delete "the" and insert -- then --, therefor.

In column 9, line 30, in Claim 1, delete "is" and insert -- it --, therefor.

In column 10, line 6, in Claim 9, after "error" insert -- enable --.

Signed and Sealed this

Eighth Day of July, 2008

JON W. DUDAS
*Director of the United States Patent and Trademark Office*